(12) United States Patent
Harada

(10) Patent No.: US 10,178,264 B2
(45) Date of Patent: Jan. 8, 2019

(54) CABLE SUPPORT MECHANISM WHICH SUPPORTS RIBBON-SHAPED FLEXIBLE CABLE AND AUTOMATIC DOCUMENT FEEDER INCLUDING SAME, AND IMAGE FORMING APPARATUS

(71) Applicant: KYOCERA Document Solutions Inc., Osaka (JP)

(72) Inventor: Hiroyuki Harada, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/915,728

(22) Filed: Mar. 8, 2018

(65) Prior Publication Data

US 2018/0270384 A1    Sep. 20, 2018

(30) Foreign Application Priority Data

Mar. 17, 2017   (JP) ................................. 2017-052202

(51) Int. Cl.
*H04N 1/00* (2006.01)
*G03G 15/00* (2006.01)

(52) U.S. Cl.
CPC ......... *H04N 1/00994* (2013.01); *G03G 15/60* (2013.01); *G03G 15/80* (2013.01); *H04N 1/0066* (2013.01); *H04N 1/00798* (2013.01); *H04N 1/00885* (2013.01)

(58) Field of Classification Search
None
See application file for complete search history.

(56) References Cited

FOREIGN PATENT DOCUMENTS

| JP | 5-107878 A | | 4/1993 |
|---|---|---|---|
| JP | 05107878 A | * | 4/1993 |
| JP | 05107878 A | * | 4/1993 |
| JP | 2007-307724 A | | 11/2007 |
| JP | 2007307724 A | * | 11/2007 |
| JP | 2007307724 A | * | 11/2007 |

* cited by examiner

*Primary Examiner* — Andrew H Lam
(74) *Attorney, Agent, or Firm* — Stein IP, LLC

(57) ABSTRACT

A cable support mechanism has a cable support portion, and supports two flexible cables which are ribbon-shaped and in each of which a plurality of conductors are arranged in parallel to each other in a coating material. The cable support portion includes a first support surface, a second support surface, and a plurality of guide ribs. The first support surface supports one of the two flexible cables. The second support surface is formed on a side reverse to a side where the first support surface is formed, and supports the other one of the two flexible cables. The guide ribs projects from two edges of each of the first support surface and the second support surface, the two edges opposing each other in a flexible-cable width direction, so as to overlap, and be spaced by a predetermined distance from, the first support surface and the second support surface.

9 Claims, 7 Drawing Sheets

CABLE SUPPORT MECHANISM WHICH SUPPORTS RIBBON-SHAPED FLEXIBLE CABLE AND AUTOMATIC DOCUMENT FEEDER INCLUDING SAME, AND IMAGE FORMING APPARATUS

INCORPORATION BY REFERENCE

This application is based upon and claims the benefit of priority from the corresponding Japanese Patent Application No. 2017-52202 filed on Mar. 17, 2017, the entire contents of which are incorporated herein by reference.

BACKGROUND

The present disclosure relates to a support mechanism for supporting a flexible cable used for wiring in electronic apparatuses, such as image forming apparatuses, which include a plurality of electronic components.

An electronic apparatus, such as an image forming apparatus, has many kinds of electronic components arranged therein. What is commonly used for electrical connection between such electronic components is a wiring cable having a connector at its each end to be joined to a connection connector provided in each electronic component.

In particular, a ribbon-shaped flexible cable (Flexible Flat Cable, FFC), in which a plurality of conductors are arranged in parallel to each other inside a coating member, is so flexible that it is bendable into any shape. This helps reduce wiring space, and thus FFCs are widely used as wiring cables in electronic apparatuses.

In a case where wiring is achieved by using two such flexible flat cables, electric signals respectively transmitted through the two flexible flat cables interfere with each other to generate electromagnetic wave noise, which becomes a main cause of a malfunction of an electronic apparatus. Further, a flexible flat cable is disadvantageously more prone to damage than normal wiring cables because of its flat ribbon-like shape.

Against such a background, there have been proposed various measures to deal with noise occurring in cases of using a flexible flat cable; for example, a method is known in which, in an electronic apparatus including a flat multi-electrode first harness which connects between electric units and is capable of transmitting signals, and a multi-electrode second harness which is arranged in parallel to the first harness, a critical signal is assigned to the Nth pin of the first harness, and signals of stable potential are assigned to the (N−1)th pin and the (N+1)th pin, which are adjacent to the Nth pin to which the critical signal is assigned, and a signal of stable potential is assigned to a pin of the second harness that physically overlaps the Nth pin of the first harness.

There is also known a method for eliminating problems of unnecessary radiation noise and so on by separating a high-voltage generating device into a high-voltage generator and a control circuit, which are connected to each other by a flat cable for various signals and power supply, and by disposing a ground line near a transmission line for transmitting signals for detecting voltage or current outputted from the high-voltage generator.

SUMMARY

According to an aspect of the present disclosure, a cable support mechanism supports two flexible cables which are each ribbon-shaped and each have a plurality of conductors arranged parallel to each other inside a coating member. The cable support mechanism has a cable support portion which is flat-plate shaped. The cable support portion includes a first support surface, a second support surface, and a plurality of guide ribs. The first support surface supports one of the two flexible cables. The second support surface is formed on a side reverse to a side on which the first support surface is formed, and supports the other one of the two flexible cables. The guide ribs project from two edges of each of the first support surface and the second support surface, the two edges being opposite to each other in a flexible-cable width direction, so as to overlap, and be spaced by a predetermined distance from, the first support surface and the second support surface.

Further features and advantages of the present disclosure will become apparent from the description of embodiments given below.

DETAILED DESCRIPTION

Figure 1:
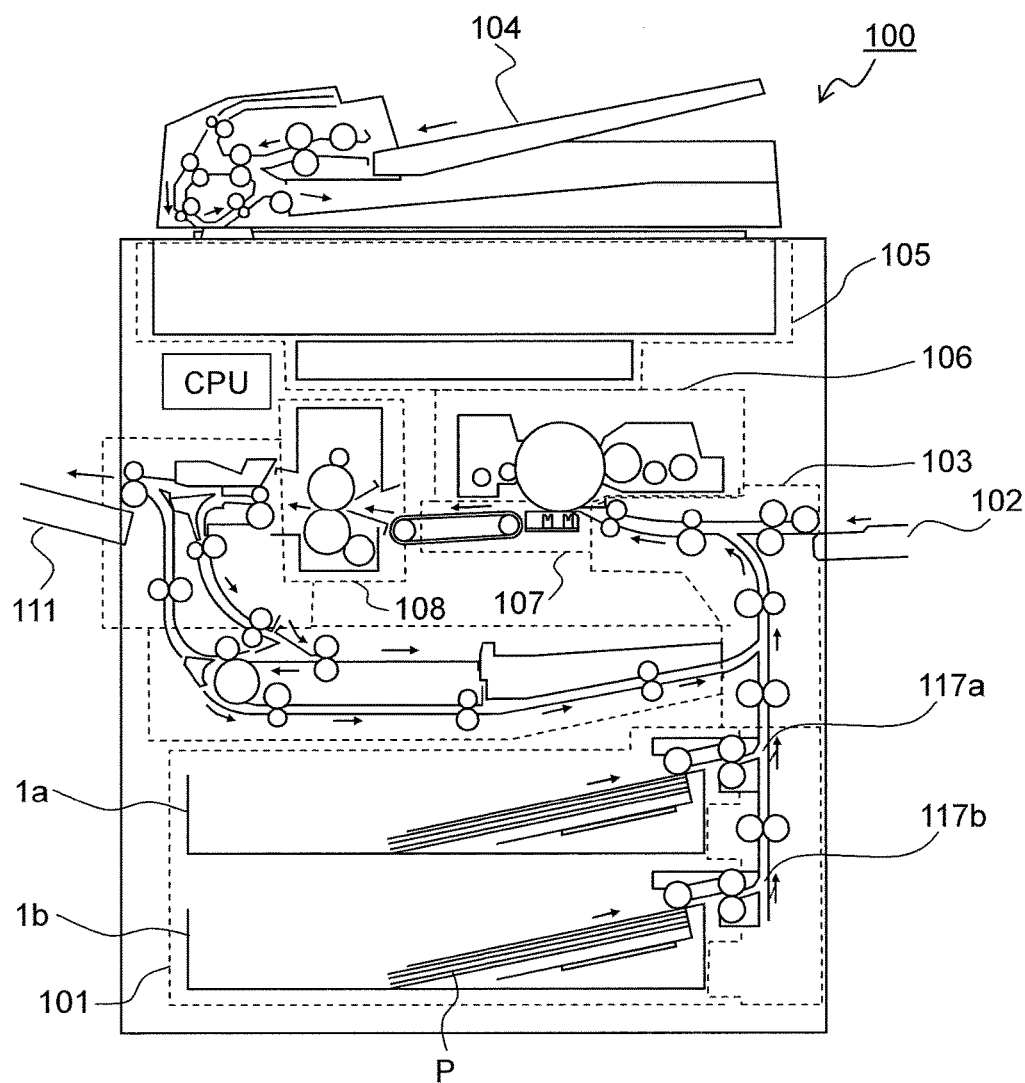
FIG. 1 is a side sectional view illustrating an internal structure of an image forming apparatus mounted with an automatic document feeder.

Hereinafter, embodiments of the present disclosure will be described in detail with reference to the accompanying drawings. FIG. 1 is a side sectional view illustrating an internal structure of an image forming apparatus 100 mounted with an automatic document feeder 104. In the figure, solid-line arrows indicate a sheet P conveying path and a sheet P conveying direction.

In FIG. 1, at a lower portion of the image forming apparatus 100, there is arranged a cassette-type automatic sheet feeder 101. The cassette-type automatic sheet feeder 101 is provided with two sheet feeder cassettes 1a and 1b. Inside each of these sheet feeder cassettes 1a and 1b, a bunch of sheets P, such as unprinted cut paper sheets, are placed in a stacked state. Sheets P are sent out by being separated one by one from the bunch of sheets P by the sheet feeder units 117a and 117b, which are disposed in a main body of the image forming apparatus 100.

A manual sheet feeding tray 102 is disposed on an upper portion of a right-side exterior surface of the image forming apparatus 100. The manual sheet feeding tray 102 is for placing thereon sheets P different in size and thickness from those in the cassette-type automatic sheet feeder 101 and printing media, such as OHP sheets, envelopes, postcards, and invoices, to be fed one by one.

Inside the image forming apparatus 100, a sheet conveying portion 103 is disposed. The sheet conveying portion 103 is located on a downstream side of the cassette-type automatic sheet feeder 101 in a sheet feeding direction, that is, on a right side with respect to the cassette-type automatic sheet feeder 101, and is located on a downstream side of the manual sheet feeding tray 102 in the sheet feeding direction, that is, on a left side with respect to the manual sheet feeding tray 102. A sheet P fed out of the cassette-type automatic sheet feeder 101 is conveyed vertically upward along a side surface of the main body of the image forming apparatus 100 by the sheet conveying portion 103, and a sheet P fed out of the manual sheet feeding tray 102 is conveyed horizontally.

At an upper portion of the image forming apparatus 100, the automatic document feeder 104 is disposed, and under it, an image reader 105 is disposed. On an upper surface of the image reader 105, a contact glass 25 (see FIG. 2) is disposed which includes an automatic reading glass 25a and a manual document reading glass 25b. To make copies of document sheets, a user places a plurality of document sheets on the automatic document feeder 104. The automatic document feeder 104 feeds out the document sheets separately one by one, and the image reader 105 reads image data from them.

Under the image reader 105, on the downstream side of the sheet conveying portion 103 in the sheet feeding direction, an image forming portion 106 and a transfer portion 107 are disposed. At the image forming portion 106, an electrostatic latent image is formed based on the image data read by the image reader 105, and the electrostatic latent image is developed into a toner image. On the other hand, in synchronization with the formation of the toner image at the image forming portion 106, a sheet P is conveyed from the cassette-type automatic sheet feeder 101 or the manual sheet feeding tray 102 via the sheet conveying portion 103 to the transfer portion 107. The toner image formed at the image forming portion 106 is transferred onto the sheet P at the transfer portion 107.

On the downstream side of the transfer portion 107, a fixing portion 108 is disposed. The sheet P onto which the toner image has been transferred at the transfer portion 107 is conveyed to the fixing portion 108, and passes through a nip portion between a pair of fixing rollers, which are a heating roller and a pressing roller. The toner image on the sheet P is thereby fixed into a permanent image. The sheet P discharged from the fixing portion 108 is ejected onto a sheet ejection tray 111 disposed on an outer left side surface of the image forming apparatus 100.

Figure 2:
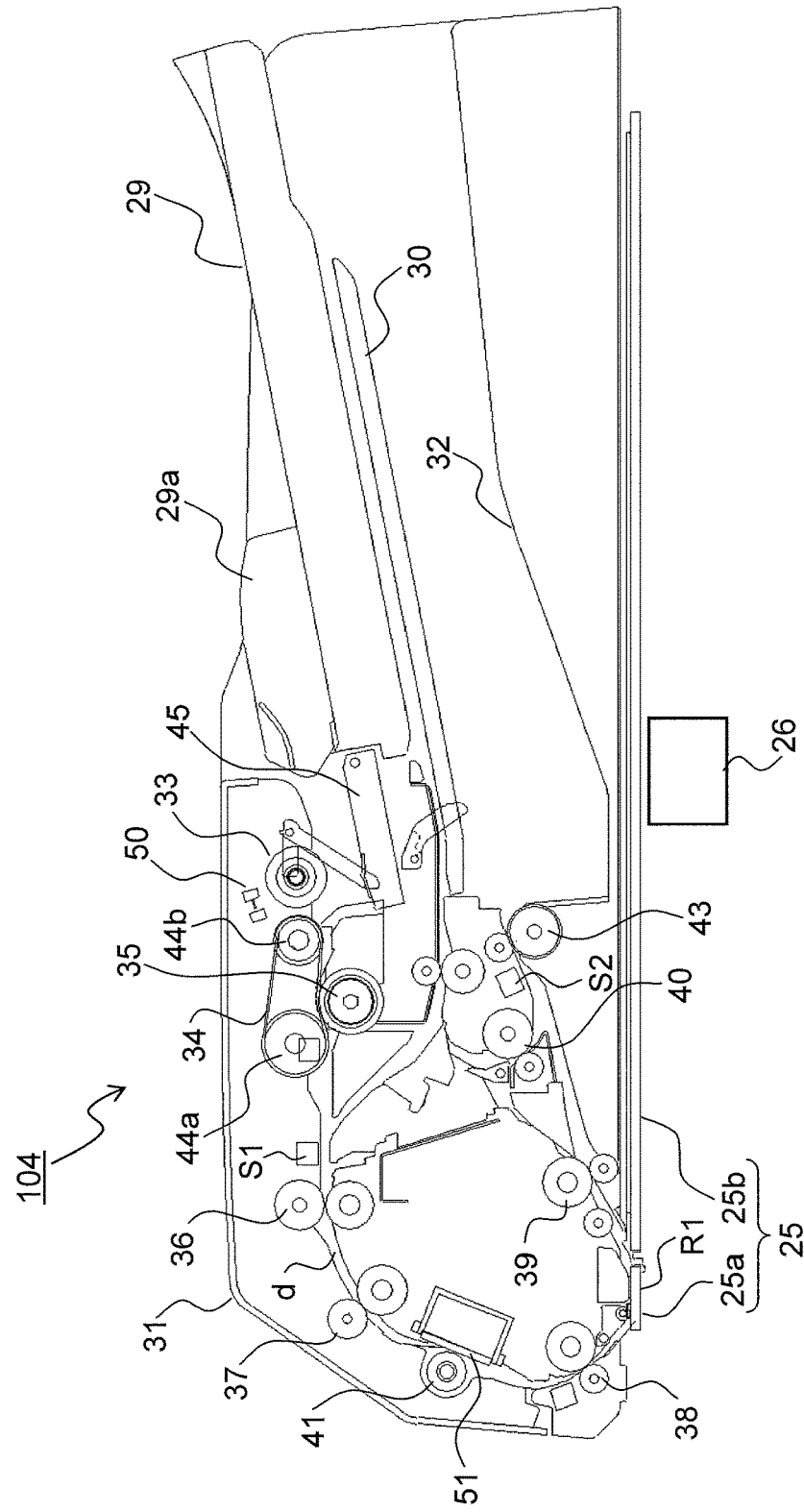
FIG. 2 is a side sectional view illustrating an internal structure of the automatic document feeder.

FIG. 2 is a side sectional view illustrating an internal structure of the automatic document feeder 104. The automatic document feeder 104 has a document feeding tray 29 which includes a document guide 29a on which to place a plurality of document sheets in alignment, and a reversal tray 30 which is disposed under the document feeding tray 29. Furthermore, with respect to a frame 104a (see FIG. 5) of the automatic document feeder 104, a cover member 31 is supported to be openable/closable about one end of the frame 104a (lower left in the figure) as a pivotal fulcrum. Beside the cover member 31, there is formed a document ejection tray 32. Inside the cover member 31, there is formed a document conveying path d extending from the document feeding tray 29 to the document ejection tray 32.

Inside the cover member 31, along the document conveying path d, there are disposed a pickup roller 33, a sheet feeding belt 34 and a separation roller 35, a registration roller pair 36, conveyance roller pairs 37, 38, 39, and 40, a CIS roller 41, a reversal roller pair 42, an ejection roller pair 43, and so on, which are document sheet conveyance members. The sheet feeding belt 34 is wound around a driving roller 44a and a driven roller 44b, and the separation roller 35 is disposed under the sheet feeding belt 34 in contact therewith with a predetermined pressure. The separation roller 35, in which a torque limiter is incorporated, rotates in a direction reverse to a direction in which the sheet feeding belt 34 rotates, only when rotation load is below a predetermined torque, and rotates following the sheet feeding belt 34 when the rotation load exceeds the predetermined torque. Above the pickup roller 33, an upper surface detecting sensor 50 is disposed which detects the position of the upper surface of a document sheet.

Here, the document conveying path d is curved into a U-shape by turning around between the registration roller pair 36 and the automatic reading glass 25a. Also, at appropriate positions along the document conveying path d, there are disposed a plurality of sheet detection sensors including a feed sensor S1 and an ejection sensor S2 for detecting presence or absence, or passing, of a document sheet.

Next, a description will be given of a document conveying operation performed based on a sheet-through method by using the automatic document feeder 104. In the sheet-through method, a plurality of document sheets are set on the document feeding tray 29 with image sides thereof up. Then, when a copy-start button on an operation panel (not shown) of the image forming apparatus 100 is turned on, a lift plate 45 is elevated by an elevator mechanism (not shown) to push up the pickup roller 33 via the documents. Weight of a frame (not shown) including the pickup roller 33 is applied to the lift plate 45, whereby a document-sheet upper surface is pressed against the pickup roller 33 with a predetermined pressure (sheet feeding pressure).

Of the document sheets set on the document feeding tray 29, the top plurality of document sheets are sent by the pickup roller 33 to a nip portion between the sheet feeding belt 34 and the separation roller 35. Then, only the topmost one of the top plurality of document sheets is separated from the other document sheets by the separation roller 35 to be conveyed toward the registration roller pair 36. At that time, when the document sheet has been conveyed by a predetermined distance since detection of a leading end of the document sheet by the feed sensor S1, a roller driving motor stops its operation of driving and rotating the pickup roller 33 and the sheet feeding belt 34, whereby a primary feeding of the document sheet is finished. The primarily fed document sheet is caused to stop in a warped state, with its leading end located at a nip portion of the registration roller pair 36.

When a predetermined time has passed since the completion of the primary document feeding, a secondary document feeding is started. That is, a secondary document feeding driving motor (not shown) operates to drive the registration roller pair 36 to rotate. The document sheet is conveyed by the registration roller pair 36, the conveyance roller pairs 37 to 39, and the CIS roller 41 toward the automatic reading glass 25a. The document sheet conveyed to the automatic reading glass 25a comes into contact with a document pressing member (not shown) disposed facing the automatic reading glass 25a to be thereby pressed against the automatic reading glass 25a from above. At this time, a reading module 26 inside the image reader 105 is disposed at a reading position R1, which is directly under the automatic reading glass 25a. Then, an image on a front side (the side facing the automatic reading glass 25a) of the document sheet is read through the automatic reading glass 25a by the reading module 26 disposed inside the image reader 105.

Then, after passing over the automatic reading glass 25a to be conveyed toward the ejection roller pair 43, the document sheet is finally ejected by the ejection roller pair 43 onto the document ejection tray 32. At that time, by the ejection sensor S2 detecting passing of a rear end of the document sheet, completion of image reading with respect to the one document sheet is detected. The ejection sensor S2 has a counting function of counting the number of conveyed document sheets each time document-sheet conveyance is completed, and when the feed sensor S1 has detected a next document sheet, document-sheet conveyance is performed with respect to the second and succeeding documents in the same manner as described above.

In a case of reading images on a two-sided document sheet, an image on a back side of the document sheet is read by the CIS sensor 51 disposed facing the CIS roller 41, and an image on a front side of the document sheet is read by the reading module 26.

Figure 3:
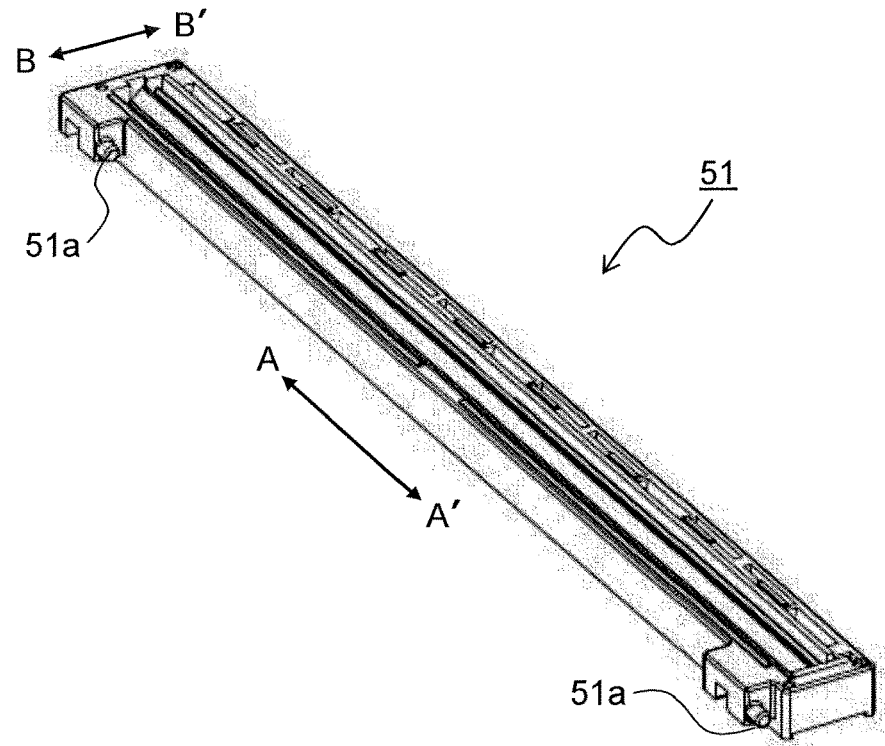
FIG. 3 is a perspective view of a CIS sensor as seen from above.
Figure 4:
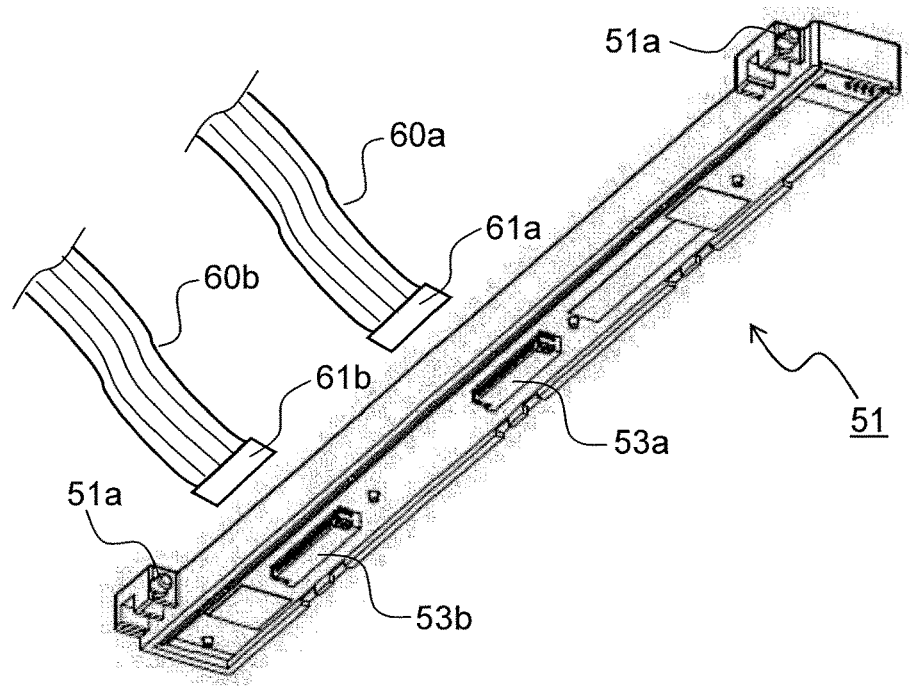
FIG. 4 is a perspective view of a CIS sensor as seen from below.

FIG. 3 and FIG. 4 are perspective views of the CIS sensor 51, as seen from above and from below, respectively. The CIS sensor 51 is a sensor which uses a photoelectric conversion element called a complementary MOS (CMOS) sensor. The CIS sensor 51 does not need to be provided with a mirror, which is necessary in a CCD sensor, which uses charge coupled devices, and thus, a scanner unit mounted with a CIS sensor can be made thin, with a merit of low cost resulting from a simple structure.

At each end of the CIS sensor 51 in its length direction (arrows AA' direction in FIG. 3), a swing shaft 51a is disposed on one end side (the side of arrow B) in its width direction (arrows BB' direction in FIG. 3). The CIS sensor 51 is supported on a CIS fitting guide 55 (see FIG. 6) to be swingable about the swing shaft 51a as fulcrums, and the other end side (the side of arrow B') of the CIS sensor 51 in its width direction is biased by a coil spring (not shown) toward the CIS roller 41 (see FIG. 2). Thereby, the CIS roller 41 and the CIS sensor 51 are kept in close contact with each other, which allows a highly accurate reading by the CIS sensor 51, which has a shallow depth of field.

On a lower face of the CIS sensor 51, sensor-side connectors 53a and 53b are disposed, to which cable-side connectors 61a and 61b, which are respectively disposed on one-end sides of two flexible cables 60a and 60b, are to be connected. Cable-side connectors 61a and 61b respectively disposed on the other-end sides of the flexible cables 60a and 60b are connected to board-side connectors 63a and 63b (see FIG. 6) of a control board 63.

Figure 5:
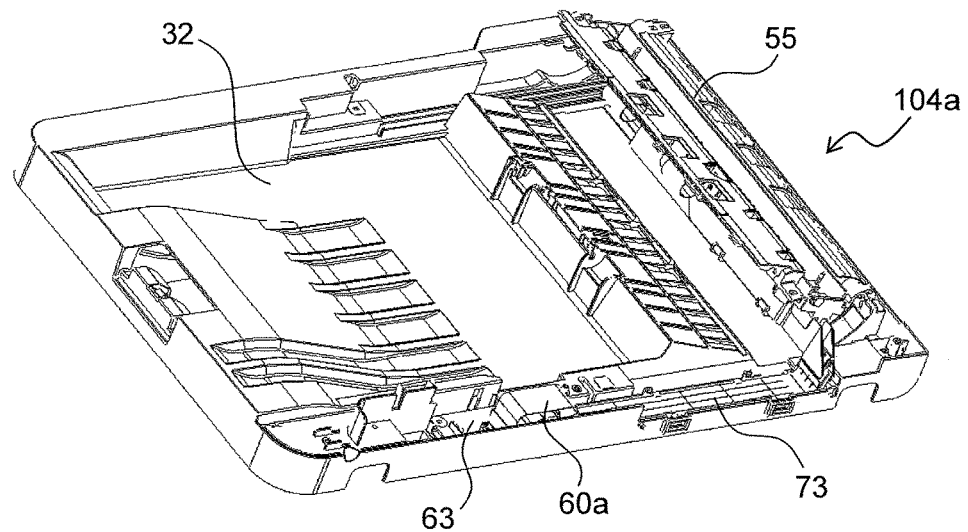
FIG. 5 is a perspective view of a frame of the automatic document feeder as seen from above.
Figure 6:
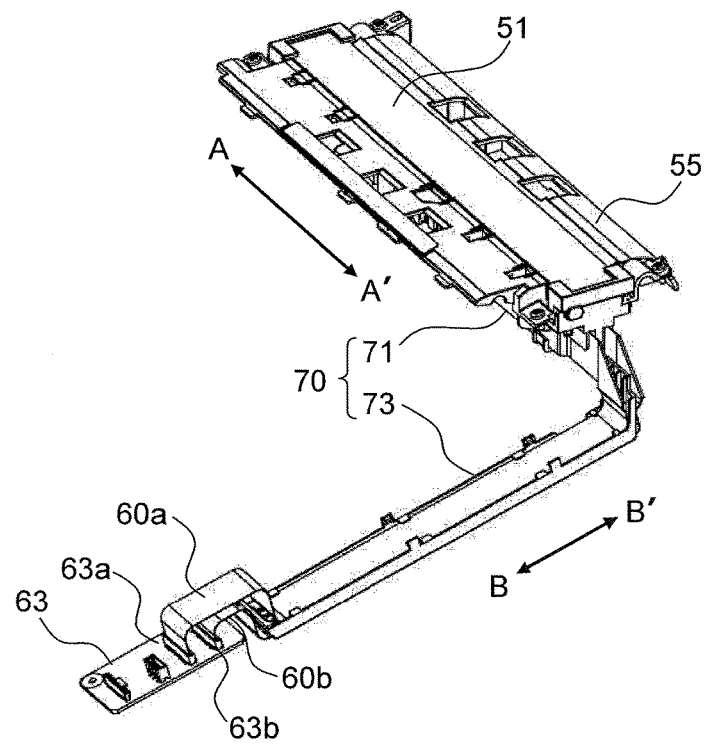
FIG. 6 is a perspective view of a CIS fitting guide and a cable support mechanism which are fitted to the frame, as seen from above.
Figure 7:
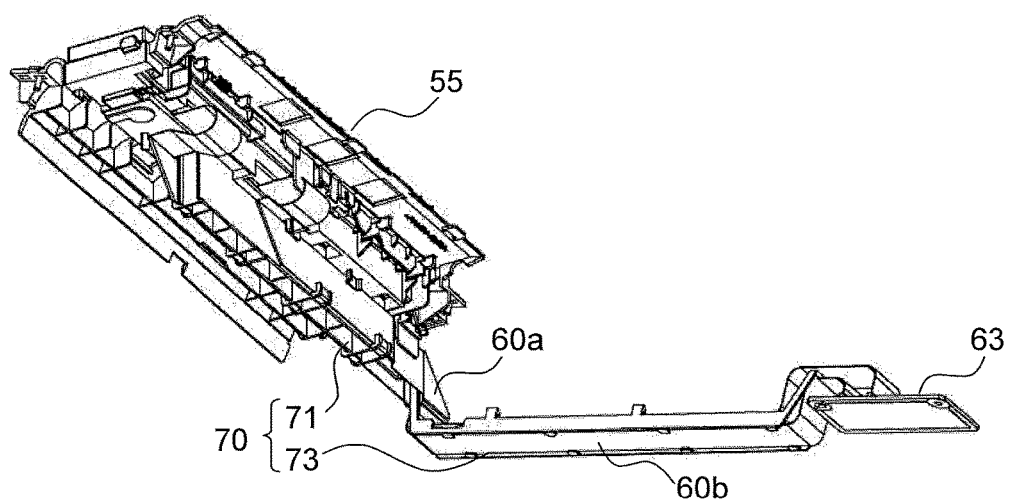
FIG. 7 is a perspective view of the CIS fitting guide and a cable support mechanism which are fitted to the frame, as seen from below.

FIG. 5 is a perspective view of the frame 104a of the automatic document feeder 104 as seen from above, and FIGS. 6 and 7 are perspective views of the CIS fitting guide 55 and a cable support mechanism 70, which are both fitted to the frame 104a, as seen from above and from below, respectively. The frame 104a has a document ejection tray 32 formed integrally therewith, and also has the CIS fitting guide 55 firmly fitted thereto. The CIS fitting guide 55 has, on its back side, a first cable support portion 71 formed integrally therewith.

The frame 104a also has the control board 63 and a second cable support portion 73 firmly fitted thereto. The control board 63, via the flexible cables 60a and 60b, transmits a control signal to the CIS sensor 51 and also receives an image signal read by the CIS sensor 51. The second cable support portion 73 extends in a direction (arrows BB' direction) perpendicular to a direction (arrows AA' direction) in which the first cable support portion 71 extends. The second cable support portion 73, together with the first cable support portion 71, constitutes the cable support mechanism 70, which holds the two flexible cables 60a and 60b with a predetermined distance therebetween.

Figure 8:
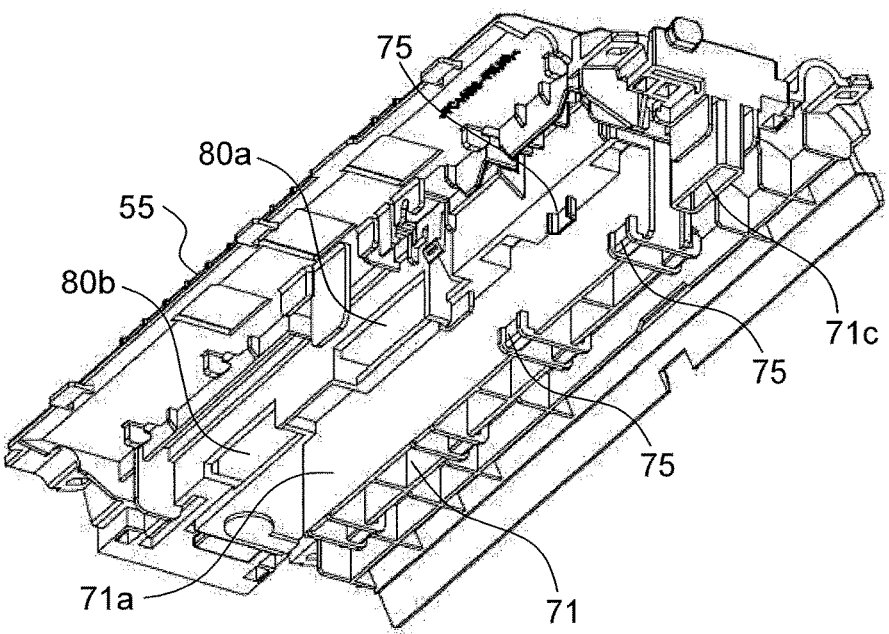
FIG. 8 is a perspective view of a back side of the CIS fitting guide, as seen from an inside of the frame.
Figure 9:
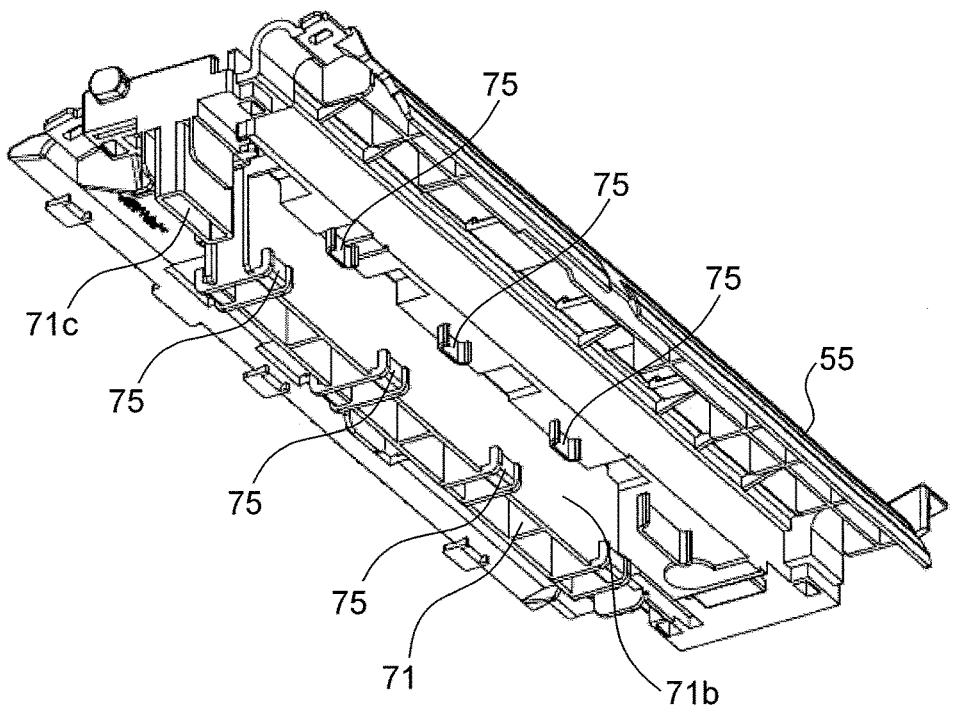
FIG. 9 is a perspective view of the back side of the CIS fitting guide, as seen from an outside of the frame.

FIG. 8 and FIG. 9 are perspective views of the back side of the CIS fitting guide 55 as seen from an inside (left side in FIG. 5) and an outside (right side in FIG. 5), respectively, of the frame 104a. The first cable support portion 71 is formed along the length direction of the CIS fitting guide 55, such that one face (inner face) of the first cable support portion 71 has formed thereon a first support surface 71a, which vertically supports the flexible cable 60a. Formed on the other face (outer face) of the first cable support portion 71 is a second support surface 71b, which vertically supports the flexible cable 60b.

A plurality of guide ribs 75 are also disposed which project from upper end portions and lower end portions of the first support surface 71a and the second support surface 71b so as to overlap the first support surface 71a and the second support surface 71b. Furthermore, at one end portion of the first cable support portion 71 in its length direction, there is formed a first guide portion 71c, which opposes a second guide portion 73e (see FIG. 10) of the second cable support portion 73.

Figure 10:
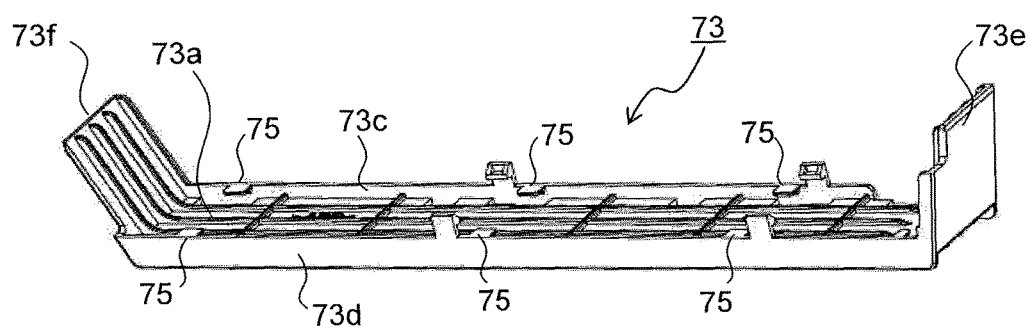
FIG. 10 is a perspective view of a second cable support portion, as seen from above.
Figure 11:
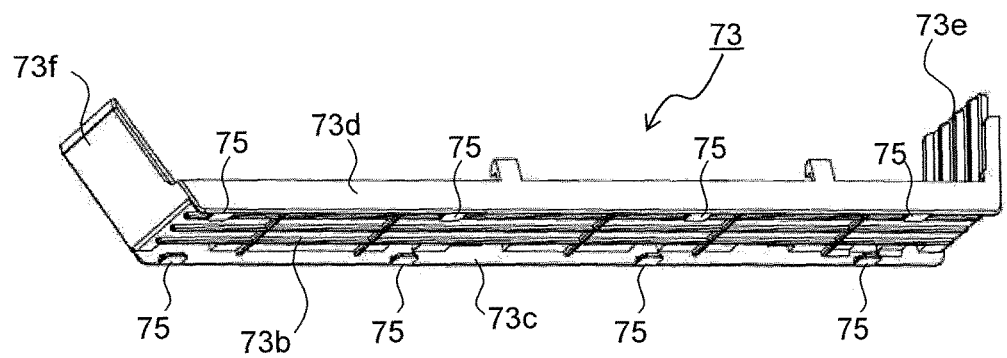
FIG. 11 is a perspective view of the second cable support portion, as seen from below.

FIG. 10 and FIG. 11 are perspective views of the second cable support portion 73, as seen from above and from below, respectively. The second cable support portion 73 is a substantially flat-plate shaped resin member, on one face (upper face) of which a first support surface 73a is formed, which horizontally supports the flexible cable 60a. Formed on the other face (lower face) of the second cable support portion 73 is a second support surface 73b, which horizontally supports the flexible cable 60b.

The second cable support portion 73 has side wall portions 73c and 73d, which are opposite to side edges of the flexible cables 60a and 60b in their width directions, with the first support surface 73a and the second support surface 73b located between the side wall portions 73c and 73d. Furthermore, a plurality of guide ribs 75 are disposed which project from the side wall portions 73c and 73d so as to overlap the first support surface 73a and the second support surface 73b.

The second cable support portion 73 has, on one end side (right end side in FIG. 10 and FIG. 11) thereof in its length direction, the second guide portion 73e, which guides the flexible cables 60a and 60b, supported on the first cable support portion 71, to the first support surface 73a and the second support surface 73b. The second guide portion 73e is substantially perpendicular to the first support surface 73a and the second support surface 73b.

The second cable support portion 73 has, on the other-end side (left end side in FIG. 10 and FIG. 11) thereof in its length direction, a third guide portion 73f, which guides the flexible cables 60a and 60b, supported on the first support surface 73a and the second support surface 73b, to the control board 63. The third guide portion 73f is inclined with respect to the first support surface 73a and the second support surface 73b by predetermined angle.

Next, a description will be given of a method of supporting the flexible cables 60a and 60b by using the cable support mechanism 70 of the present embodiment. First, the cable-side connectors 61a and 61b of the flexible cables 60a and 60b on their one ends are respectively connected to the sensor-side connectors 53a and 53b (see FIG. 4) of the CIS sensor 51. Next, the flexible cable 60a is drawn out through an opening portion 80a of the CIS fitting guide 55 to extend along the first support surface 71a of the first cable support portion 71, and is then inserted in gaps between the first support surface 71a and the guide ribs 75. Likewise, the flexible cable 60b is drawn out through an opening portion 80b of the CIS fitting guide 55 to extend along the second support surface 71b of the first cable support portion 71, and is then inserted in gaps between the second support surface 71b and the guide ribs 75. Thereby, the flexible cables 60a and 60b are supported on the first support surface 71a and the second support surface 71b, respectively, of the first cable support portion 71.

Next, with the flexible cable 60a bent at right angles to be inside out, the flexible cable 60a is guided downward along the first guide portion 71c of the first cable support portion 71 and the second guide portion 73e of the second cable support portion 73. Then, the flexible cable 60a is extended along the first support surface 73a and inserted in gaps between the first support surface 73a and the guide ribs 75. Likewise, with the flexible cable 60b bent at right angles to be inside out, the flexible cable 60b is guided downward along the first guide portion 71c and the second guide portion 73e to extend along the second support surface 73b of the second cable support portion 73, and is then inserted in gaps between the second support surface 73b and the guide ribs 75. Thereby, the flexible cables 60a and 60b are supported on the first support surface 73a and the second support surface 73b, respectively, of the second cable support portion 73.

Thereafter, the flexible cable 60a is guided along an upper surface of the third guide portion 73f to connect the cable-side connector 61a on the other end to the board-side connector 63a (see FIG. 6) of the control board 63. On the other hand, the flexible cable 60b is guided along a lower surface of the third guide portion 73f, and the cable-side connector 61b on the other end is connected to the board-side connector 63b (see FIG. 6) of the control board 63. In this manner, the CIS sensor 51 and the control board 63 are connected to each other by the flexible cables 60a and 60b. Finally, the CIS fitting guide 55, the second cable support portion 73, and the control board 63 are attached to the frame 104a, whereby the fitting of the CIS sensor 51 is completed.

According to the configuration of the present embodiment, the flexible cables 60a and 60b are connected to the control board 63 in a state where they are supported along the first support surface 71a and the second support surface 71b formed in the first cable support portion 71 and along the first support surface 73a and the second support surface 73b formed in the second cable support portion 73, and thus it is possible to arrange the two flexible cables 60a and 60b to be spaced from each other by a predetermined distance. Thereby, it is possible to perform processing of wiring the flexible cables 60a and 60b by means of a simple and inexpensive method in a space-saving manner. Furthermore, electric signals transmitted by means of the flexible cables 60a and 60b do not interfere with each other, and thus it is possible to effectively reduce occurrence of electromagnetic wave noise attributable to interference between electric signals.

In particular, since the CIS sensor 51, which becomes a source of electromagnetic wave noise, is disposed in the automatic document feeder 104, the use of the cable support mechanism 70 of the present embodiment in connecting the CIS sensor 51 to the control board 63 contributes to more effective reduction of electromagnetic wave noise.

Here, in the CIS sensor 51, which transmits electric signals by means of the two flexible cables 60a and 60b, if the flexible cables 60a and 60b are not spaced from each other by a distance of 3 mm or more, signals transmitted via the flexible cables 60a and 60b are so close to each other that noise will be generated to become a main cause of malfunction and defective images. To prevent this, it is preferable that the distance between the first support surface 71a and the second support surface 71b formed in the first cable support portion 71 and the distance between the first support surface 73a and the second support surface 73b formed in the second cable support portion 73 both be 3 mm or more.

Furthermore, with the first guide portion 71c disposed at the second-cable-support-portion-73 side end portion of the first cable support portion 71, and the second guide portion 73e opposing the first guide portion 71c is disposed on the second cable support portion 73, the flexible cables 60a and 60b supported along the first cable support portion 71 are guided, along the side surfaces of the first guide portion 71c and the second guide portion 73e, to the second cable support portion 73. Accordingly, it is possible to prevent the flexible cables 60a and 60b from coming in contact with each other in a gap between the first cable support portion 71 and the second cable support portion 73. In order for the distance between the flexible cables 60a and 60b to be 3 mm or more, it is preferable that thicknesses of the first guide portion 71c and the second guide portion 73e be 3 mm or more.

Moreover, the third guide portion 73f disposed at the control-board-63 side end portion of the second cable support portion 73 has a predetermined angle with respect to the first guide surface 73a and the second guide surface 73b. This makes it possible to dispose the flexible cable 60a, which extends over the third guide portion 73f to be connected to the control board 63, and the flexible cable 60b, which extends under the third guide portion 73f to be connected to the control board 63, to be spaced from each other by a maximum distance.

It should be understood that the present disclosure is not limited to the above embodiments, and various modifications are possible within the scope of the present disclosure. For example, the cable support mechanism 70 of the present disclosure is used for wiring the flexible cables 60a and 60b connecting the CIS sensor 51 to the control board 63 inside the automatic document feeder 104 in the above embodiment, but this is not meant as a limitation, and the cable support mechanism 70 can also be used for wiring any flexible cable connecting other devices in the image forming apparatus 100, such as the image reader 105, the image forming portion 106, and the transfer portion 107, to the control board.

Further, the present disclosure is not limited to a digital multifunction peripherals as illustrated in FIG. 1, and is also applicable to various image forming apparatuses, such as monochrome and color printers, color copiers, facsimile machines, and so on. Moreover, needless to say, the present disclosure is also applicable to flexible cable support mechanisms for use in other electronic apparatuses besides image forming apparatuses.

The present disclosure is usable in a flexible cable support mechanism used for wiring in electronic apparatuses, such as image forming apparatuses, and so on, having a plurality of electronic components. By using the present disclosure, it is possible to provide a cable support mechanism capable of, by means of a simple method, effectively reducing electromagnetic wave noise generated in wiring where two flexible cables are used.

What is claimed is:

1. A cable support mechanism which is flat-plate shaped, the cable support portion comprising:
a cable support portion which is flat-plate shaped, the cable support portion including
a first support surface which supports one of two flexible cables which are ribbon-shaped and each have a plurality of conductors arranged in parallel to each other inside a coating member;
a second support surface which is formed on a side reverse to a side on which the first support surface is formed, and supports an other one of the two flexible cables; and
a plurality of guide ribs which project inward from two sides of each of two edges of each of the first support surface and the second support surface, the two edges being opposite to each other in a flexible-cable width direction, so as to overlap, and be spaced by a predetermined distance from, the first support surface and the second support surface, the guide ribs holding the flexible cables in gaps which the guide ribs form with the first support surface and the second support surface,
wherein
the cable support portion and the guide ribs are made of resin,
the first support surface is one of a pair of flat surfaces constituting a front surface and a back surface of the cable support portion, and
the second support surface is an other one of the pair of flat surfaces.

2. The cable support mechanism according to claim 1, wherein
a distance between the first support surface and the second support surface is 3 mm or more.

3. The cable support mechanism according to claim 1, wherein
the cable support portion includes
a first cable support portion which vertically supports the two flexible cables, and
a second cable support portion which extends in a direction perpendicular to a direction in which the first cable support portion extends, and which horizontally supports the two flexible cables,
the first cable support portion has a first guide portion formed at one end thereof adjacent to the second cable support portion, and
the second cable support portion has a second guide portion formed at on end thereof adjacent to the first cable support portion so as to oppose the first guide portion.

4. The cable support mechanism according to claim 3, wherein
the first guide portion and the second guide portion each have a thickness of 3 mm or more.

5. The cable support mechanism according to claim 3, wherein
at an end of the second cable support portion opposite from the second guide portion, a third guide portion is formed which has a predetermined angle with respect to the first support surface and the second support surface.

6. An automatic document feeder comprising
a CIS sensor which reads a document image; and
a control board which is connected to the CIS sensor by the two flexible cables,
wherein
the two flexible cables are supported between the CIS sensor and the control board by using the cable support mechanism according to claim 1.

7. The automatic document feeder according to claim 6, further comprising:
a frame; and
a CIS fitting guide which is firmly fitted to the frame, and to which the CIS sensor is fitted,
wherein
the cable support portion includes
a first cable support portion which vertically supports the two flexible cables and
a second cable support portion which extends in a direction perpendicular to a direction in which the first cable support portion extends, and which horizontally supports the two flexible cables, and
the first cable support portion is integrally formed with the CIS fitting guide on a back side of the CIS fitting guide.

8. The automatic document feeder according to claim 7, wherein
the first cable support portion has a first guide portion formed at an end thereof adjacent to the second cable support portion,
the second cable support portion has a second guide portion formed at an end thereof adjacent to the first cable support portion so as to oppose the first guide portion, and
the second cable support portion further has a third guide portion formed at an end thereof opposite from the second guide portion and adjacent to the control board, the third guide portion having a predetermined angle with respect to the first support surface and the second support surface.

9. An image forming apparatus comprising the automatic document feeder according to claim 6.

* * * * *